UNITED STATES PATENT OFFICE.

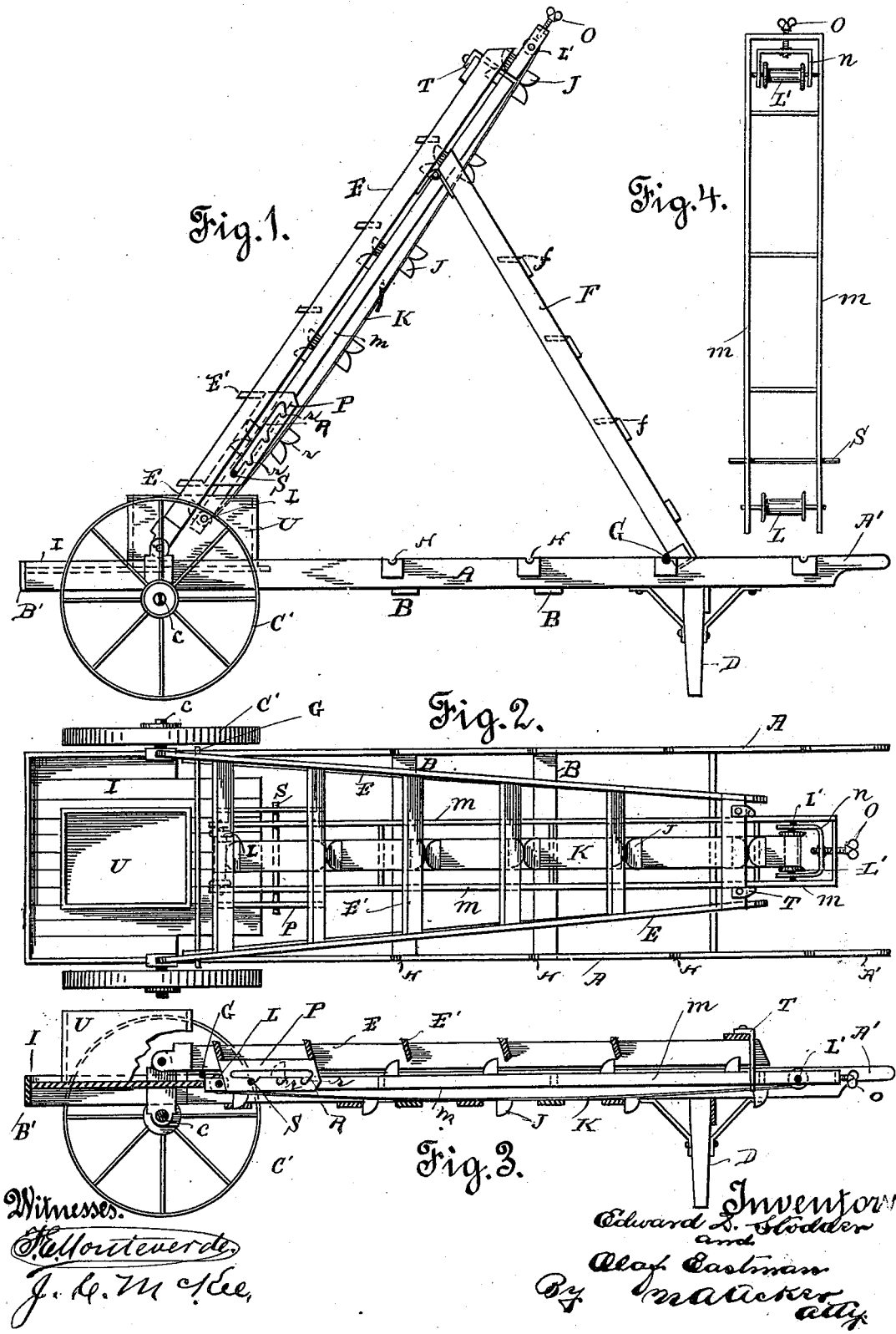

EDWARD D. STODDER AND OLAF EASTMAN, OF SAN FRANCISCO, CALIFORNIA.

FRUIT-PICKING APPARATUS.

SPECIFICATION forming part of Letters Patent No. 510,055, dated December 5, 1893.

Application filed July 7, 1891. Serial No. 398,660. (No model.)

*To all whom it may concern:*

Be it known that we, EDWARD D. STODDER and OLAF EASTMAN, citizens of the United States, residing at San Francisco, in the county of San Francisco and State of California, have invented certain new and useful Improvements in Fruit-Picking Apparatus; and we do hereby declare the following to be a full, clear, and exact description of said invention, such as will enable others skilled in the art to which it most nearly appertains to make, use, and practice the same.

Our invention has relation to certain new and useful improvements in fruit picking apparatus, which consists in the arrangement of parts and details of construction as will be hereinafter more fully set forth in the drawings, described and pointed out in the specification.

Our invention relates more especially to an improved apparatus adapted to facilitate the picking of fruit from trees so situated as to render the same impossible from the ground, and has for its object to permit of free, easy and quick movement through an orchard without injury resulting to the trees or fruit, or the knocking of the same therefrom, which results from the use of ladders, and which can be so adjusted as to allow of the gathering or picking of the fruit from any part of the tree without necessitating the bearing thereof against the same, thus obviating injury resulting thereto.

A further object of our invention is to enable the fruit gatherer to secure the fruit from any portion of the tree and convey and deposit the same into a fruit holding receptacle, for transportation from the orchard, without necessitating the picker descending from the tree or damage resulting to the fruit by becoming bruised.

Our invention consists in providing a combination of ladders mounted on a horizontal frame work, which is supported by wheels and legs, and of a frame arranged to be raised or lowered between the ladders having an endless traveling belt, provided with a series of fruit holding buckets, working therein and adapted to convey the picked fruit to the fruit holding receptacle and deposit the same therein without injury resulting thereto, and of mechanism by which the conveyer frame may be adjusted from any part of the ladder so as to regulate the fall given to the fruit deposited.

For a more comprehensive understanding of our invention reference must be had to the accompanying drawings, wherein similar letters of reference denote corresponding parts throughout the several views and entire specification.

Figure 1, is a side view in elevation; Fig. 2 a top plan view showing the apparatus in a closed position; Fig. 3 a longitudinal sectional view through center of Fig. 2; and Fig. 4 a detail of the conveyer frame.

In carrying out our invention we construct a base or horizontal frame work, consisting of side pieces or strips A, which are secured or held together by means of cross pieces B, and end piece B'. The outer or forward end of the side pieces is cut away so as to form handles A'. The base or horizontal frame is secured near one end, upon axle C, which has secured to the outer ends thereof wheels C', which permit of the same being readily moved or rolled from place to place, while when at rest the forward end of the frame stands or is supported upon legs D.

Near the rear end of the frame and over axle C, is pivoted the ladder E, provided with steps or rungs E', which is adapted to be held at any inclination or elevation through the medium of rear ladder F, pivotally secured to under side of ladder E, as clearly shown in Fig. 1. By having the ladders pivotally secured they are permitted to be folded together as shown in Figs. 2 and 3, so as to lie flat upon the horizontal frame, or to be raised or held at different inclines.

Secured to the inner edge and near the lower end of supplemental or supporting ladder F, is an iron rod G, which extends across the horizontal frame and which is adapted to fit within the notches H, cut in the upper edges of side pieces A, thus supporting and holding the supplemental ladder in proper position and at the same time permitting the inclination of ladder E, to be regulated by merely moving the supplemental ladder so as to allow rod G, to rest in either of the notches H.

When in use, (as shown in Fig. 1) as the supplemental ladder moves outward ladder E is lowered, while when moved inward the same is raised. Notches H, may be cut directly in the side pieces of the horizontal frame, or may be formed in plates secured thereto.

To the rear of the horizontal or base frame is secured the platform I, which extends from cross piece B', over axle C, as shown in Figs. 1 and 2, and which is adapted to receive or hold thereon a fruit receptacle, which may consist of a box or basket, U. This receptacle is placed upon the platform I, so that as the ladders are folded down, rod G, will contact therewith and push the fruit receptacle along the platform out of the way of the folding ladders. The fruit as picked is conveyed to the fruit receptable by means of the conveyer or endless belt K, which is provided with a series of buckets or pockets J, into which the fruit is placed. The endless fruit conveyer is secured within a conveyer frame m, and works over rollers L, L', journaled at the top and bottom of said frame. The conveyer may be properly termed a gravity one, inasmuch as the same travels over rollers L, L', by the weight of the fruit placed within the pockets or buckets J. As the conveyer travels over the rollers the fruit is carried downward and deposited in receptacle U, located thereunder to receive the same.

The conveyer frame m consists of parallel pieces united by cross strips, as shown in Fig. 4.

In order to regulate the tension of conveyer K, we provide the conveyer frame with sliding frame N, within which is journaled roller L', which is moved up or down by means of a thumb screw O, which passes through the conveyer frame and is swiveled in the upper end of sliding frame. It is obvious that by the turning of the thumb screw, the sliding frame and roller L', are raised or lowered, and consequently the conveyer belt is tightened or loosened.

To the lower steps or sides of the ladder E, we secure wood or iron plates P, on each side of the conveyer frame, which have provided therein elongated openings or slots R. Said plates are provided with notches r, as clearly shown in Figs. 1 and 3. An iron rod S, passes through the conveyer frame and projects into slotted plates P, thus holding the lower end of the conveyer frame in place and thus preventing its falling away from the ladder E, while the upper end of said frame is secured to the ladder by means of an angle iron T, which is so secured as to permit of the frame sliding up or down.

Inasmuch as the conveyer frame is movably secured to ladder E, it is obvious that the conveyer buckets may readily be removed from the fruit receptacle by simply raising the conveyer frame upward until rod S, falls into next notch r. Thus as the receptacle becomes filled the conveyer may be lifted in order to prevent mashing or bruising of deposited fruit.

In place of slotted plates P, rack-plates may be employed and guide ways for holding the conveyer frame in place.

Supplemental or supporting ladder F, is provided with steps or rungs f, so as to enable the fruit to be picked from either side, and for this purpose the conveyer buckets or pockets are made double so as to allow the fruit to be placed therein from either ladder.

By providing or forming the fruit buckets double the picked fruit may be deposited by the picker from either ladder and thus obviate the necessity of reaching over in order to place the fruit. By this arrangement of buckets the conveyer is caused to travel in either direction by the weight of the fruit in the buckets.

In operation our apparatus is moved along side of the fruit tree and the ladders raised to the desired inclination, when the fruit receptacle is moved or placed upon the platform beneath the conveyer frame, which is lowered until rod S, rests against lower end of slot R. As the fruit is picked the same is placed within the conveyer pockets and the weight thereof will cause the rotation of conveyer belt upon the rollers L, L', unless the tension thereof is too tight, in which case the same is loosened by turning of thumb-screw O. As the pockets pass under lower roller the fruit contained therein is dropped into the fruit receptacle. As the receptacle becomes filled the operator raises the conveyer frame M, until rod S, falls into the first notch r, and as the receptacle becomes more and more full the frame is raised higher until the rod S, drops into the next notch and so on. The notches, or rack-plate, may be spaced so as to allow of the fruit falling only a slight distance. As one receptacle becomes filled it may be replaced by another.

We are aware that minor changes may be made in the arrangement of parts and details of construction without necessitating or creating a departure from the nature and scope of our invention.

Having thus described our invention, what we claim as new, and desire to secure protection in by Letters Patent of the United States, is—

1. In a fruit picking apparatus, the combination with the ladder, of the conveyer frame secured thereto, of the endless conveyer working therein, and of the fruit pockets secured thereto, as and for the purpose set forth.

2. The combination with a fruit picking apparatus, of the endless traveling conveyer provided with a series of double fruit pockets, said conveyer adapted to be rotated in either direction by the weight of the fruit, as and for the purpose set forth.

3. In a fruit picking apparatus, the combination with the conveyer frame provided with upper and lower rollers, endless conveyer secured therein and over said rollers, double fruit pockets secured to the conveyer for holding of fruit, said conveyer adapted to be rotated in either direction by weight of the fruit, as and for the purpose set forth.

4. In a fruit picker, the combination with the ladders, of an endless traveling conveyer provided with fruit pockets, said conveyer adapted to be rotated by weight of the fruit, and of a tension regulating device for said conveyer, as and for the purpose set forth.

5. In a fruit picking apparatus, the combination with the base frame thereof, of the ladder pivotally secured thereto, supplemental or supporting ladder pivoted thereto and adapted to regulate the inclination thereof, and of the endless conveyer, provided with fruit pockets, working between the pivoted ladders and adapted to be rotated by weight of the fruit, as and for the purpose set forth.

6. In a fruit picking apparatus, the combination with the ladder E, of the conveyer frame movably secured thereto, endless traveling fruit conveyer working within the frame by the weight of the fruit, said frame being adapted to be raised or lowered so as to increase or decrease the distance of fall of the conveyed fruit, as and for the purpose set forth.

7. In a fruit picking apparatus, the combination with the supporting frame, picking ladder pivoted thereto, supplemental ladder pivoted to the picking ladder, supporting rod passing through the lower end of the supplemental ladder and adapted to fit within notches formed within the supporting frame so as to regulate the incline of the ladders, a fruit receptacle, and of the endless traveling conveyer working within the conveyer frame and adapted to be rotated by the weight of the fruit, as and for the purpose set forth.

8. In a picking apparatus for fruit, the combination with the ladder pivotally secured to the supporting frame, of the conveyer frame movably secured thereto, slotted plates within which a projecting rod of the frame works, notches cut in said plates within which said rod rests when the frame is raised or lowered, endless traveling conveyer, provided with fruit pockets, working within said frame, and of the tension regulator for the conveyer, as and for the purpose set forth.

9. In a picking apparatus for fruit, the combination with the movable supporting frame, adjustable ladders pivotally secured one to the other and to the frame, platform provided at one end of the frame, conveyer frame movably secured to the picking ladder, endless traveling conveyer working within said frame, fruit pockets secured thereto, and of the tension regulator for the endless conveyer, as and for the purpose set forth.

10. In a fruit picking apparatus, the combination with the endless traveling conveyer, of the double fruit pockets secured thereto, as and for the purpose set forth.

In testimony whereof we affix our signatures in presence of two witnesses.

EDWARD D. STODDER.
OLAF EASTMAN.

Witnesses:
N. A. ACKER,
J. W. KEYS.